United States Patent
Medhat et al.

(10) Patent No.: US 6,529,595 B1
(45) Date of Patent: Mar. 4, 2003

(54) METHOD AND APPARATUS TO PROCESS NUMBER PORTABILITY DATA FOR A CALL

(75) Inventors: Khalid M. Medhat, Overland Park, KS (US); Jason Torrey, Overland Park, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

(21) Appl. No.: 09/452,765

(22) Filed: Dec. 1, 1999

(51) Int. Cl.⁷ .................................................. H04M 7/00
(52) U.S. Cl. ............................ 379/221.13; 379/221.08; 379/221.14; 379/230
(58) Field of Search ....................... 379/211.02, 220.01, 379/221.08, 221.13, 221.14, 230

(56) References Cited

U.S. PATENT DOCUMENTS

| | | | | |
|---|---|---|---|---|
| 4,754,479 A | * | 6/1988 | Bicknell et al. ........ | 379/221.01 |
| 5,732,131 A | * | 3/1998 | Nimmagadda et al. | 379/221.02 |
| 5,793,857 A | * | 8/1998 | Barnes et al. .......... | 379/221.02 |
| 5,854,836 A | * | 12/1998 | Nimmagadda ......... | 379/221.08 |
| 5,867,570 A | * | 2/1999 | Bargout et al. ........ | 379/211.02 |
| 5,881,145 A | * | 3/1999 | Giuhat et al. .......... | 379/211.02 |
| 5,943,411 A | * | 8/1999 | Houck et al. .......... | 379/211.02 |
| 5,949,865 A | * | 9/1999 | Fusinato ................... | 379/219 |
| 5,949,870 A | * | 9/1999 | Hayduk et al. ........ | 379/221.13 |
| 6,028,914 A | * | 2/2000 | Lin et al. .................... | 379/133 |
| 6,058,313 A | * | 5/2000 | Slutsman et al. ...... | 379/221.13 |
| 6,081,590 A | * | 6/2000 | Crowley et al. ........ | 379/220.01 |
| 6,122,362 A | * | 9/2000 | Smith et al. ................. | 358/450 |
| 6,154,534 A | * | 11/2000 | Bredberg et al. ....... | 379/207.02 |
| 6,366,663 B1 | * | 4/2002 | Bauer et al. .................. | 379/219 |
| 6,427,010 B1 | * | 7/2002 | Farris et al. ........... | 379/221.13 |
| 6,438,219 B1 | * | 8/2002 | Karau et al. ................ | 358/450 |
| 6,438,223 B1 | * | 8/2002 | Eskafi et al. ................ | 370/360 |

* cited by examiner

*Primary Examiner*—Harry S. Hong
(74) *Attorney, Agent, or Firm*—Harley R. Ball; Steven J. Funk; Kevin D. Robb

(57) ABSTRACT

A second network such as an interexchange carrier advantageously identifies incorrect original number portability data from the first network such as a local telephone company and obtains new number portability data to prevent misrouted calls. The second network receives original number portability data from the first network. The second network determines whether to use the original number portability data from the first network for call routing. If the original number portability data from the first network is not used for call routing, the second network generates and transmits a query to obtain new number portability data for call routing. The second network receives the new number portability data for call routing in response to the query. The second network then generates and transmits a route instruction using the new number portability data. If the original number portability data from the first network is used for call routing, the second network generates and transmits the route instruction using the original number portability data. In some embodiments, the threshold for misrouted calls ensures that incorrect number portability data is not used repeatedly and the correct number portability data is used for call routing.

57 Claims, 7 Drawing Sheets

METHOD AND APPARATUS TO PROCESS NUMBER PORTABILITY DATA FOR A CALL

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a system that processes number portability data for a call.

2. Description of the Prior Art

Number portability provides users the ability to retain their phone number when changing either their service provider, location or service. Switching telephone companies is one example of changing service providers. One example of changing services is changing from Plain Old Telephone Service (POTS) to Integrated Services Digital Network (ISDN).

FIG. 1 depicts a system level block diagram of a prior solution for call processing with number portability. In FIG. 1, a call processing system 130 and a call processing system 150 are disclosed in a pending U.S. patent application Ser. No., entitled "System and Method for Processing a Call", filed on Nov. 5, 1999, which is hereby incorporated by reference. An interexchange carrier (IXC) 120 typically queries an IXC Service Control Point (SCP) 122 for number portability data. The number portability data could be any data or information associated with providing number portability. However, changes in standards for number portability allow the originating network such as a local telephone company 110 to query a local telephone company SCP 112 for the number portability data.

FIG. 2 depicts a message sequence chart for a prior solution for call processing with number portability. In FIG. 2, the IXC 120 has agreed to accept the number portability data from the local telephone company 110. A local telephone company switch 114 begins processing of a call by querying the SCP 112 with an invoke message for the number portability data. The SCP 112 processes the invoke message and identifies the number portability data for the call. The SCP 112 transmits a response with the number portability data to the switch 114.

The switch 114 transmits an Initial Address Message (IAM) including the number portability data for the call using Signaling System #7 (SS7) to a signaling processor 132. The signaling processor 132 then receives the IAM with the original number portability data. The signaling processor 132 processes the IAM to generate and transmit a first route instruction for a routing system 134 based on the processing of the IAM with the number portability data. The signaling processor 132 also transmits the IAM with the number portability data to the signaling processor 152.

The signaling processor 152 then receives the IAM with the number portability data. The signaling processor 152 processes the IAM. The signaling processor 152 then generates and transmits a second route instruction for a routing system 154 based on the processing of the IAM with the number portability data. The signaling processor 152 also transmits the IAM with the number portability data to a local telephone company switch 164 in a local telephone company 160. The switch 164 processes the IAM. The switch 164 responds with a series of messages for call setup, which are not shown for the sake of clarity. Those skilled in the art understand how the call is set up between the switch 114 and the switch 164 via the routing system 134, the packet network 140, and the routing system 154.

The problem is that the number portability data from the local telephone company 110 may not always be correct. The IXC 120 then misroutes the call with the faulty number portability data. Call misrouting and then call failure may decrease the caller's satisfaction with the IXC's 120 telecommunication service. For long distance calls, customers usually call the IXC 120 if there are problems with call routing, which result in call failure. In order to prevent call failure and properly route calls, the IXC 120 needs the ability to obtain correct number portability data.

SUMMARY OF THE INVENTION

The invention solves the above problem by identifying incorrect original number portability data from a first network and obtaining new number portability data. The invention advantageously prevents call misrouting due to incorrect number portability data from the first network. A second network avoids decreasing customer satisfaction by properly routing calls with the new number portability data. The second network receives original number portability data from the first network. The second network then determines whether to use the original number portability data from the first network for call routing. If the original number portability data from the first network is not used for call routing, the second network generates and transmits a query to obtain new number portability data for call routing. The second network receives the new number portability data for call routing in response to the query. The second network then generates and transmits a route instruction using the new number portability data. If the original number portability data from the first network is used for call routing, the second network generates and transmits the route instruction using the original number portability data.

In one embodiment of the invention, the second network determines whether calls are misrouted. The second network then processes the number of misrouted calls to determine whether a threshold has been exceeded. The second network then disregards the original number portability data from the first network for call routing based on the determination that the threshold has been exceeded. In different embodiments of the invention, the threshold may be set on a per trunk basis, per trunk group basis, per Point Code basis, per a first network basis, per called party number basis, or per every call basis. Also, in different embodiments of the invention, the threshold may be a total number of misrouted calls or a misrouted call percentage of total calls, attempted calls, or correctly routed calls.

The invention advantageously identifies incorrect original number portability data from a first network and obtains new number portability data to prevent misrouted calls. In some embodiments, the threshold for misrouted calls ensures that incorrect number portability data is not used and the correct number portability data is used for call routing.

DETAILED DESCRIPTION OF THE INVENTION

Figure 1:
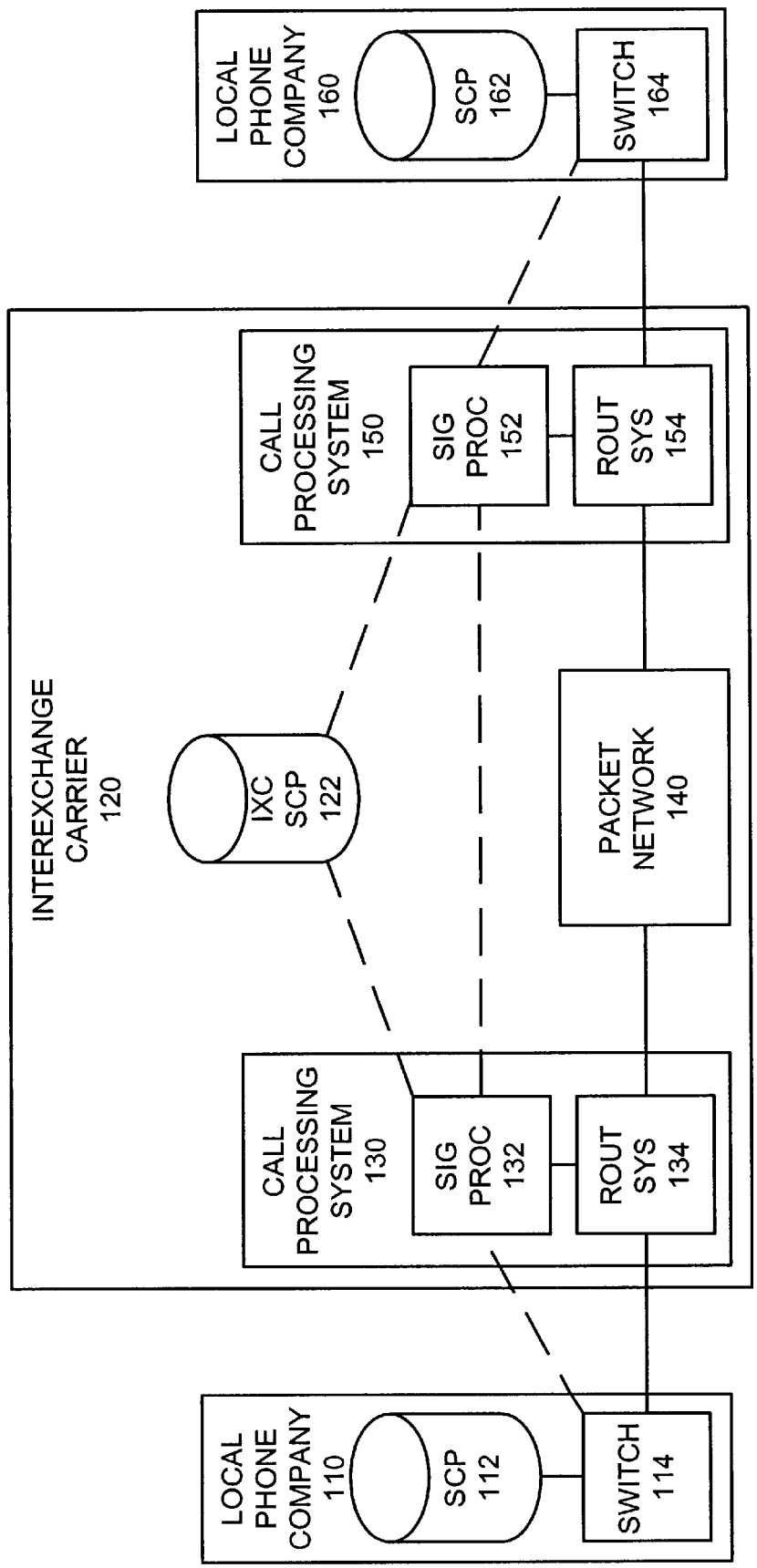
FIG. 1 is a system level block diagram of a prior solution for call processing with number portability.
Figure 2:
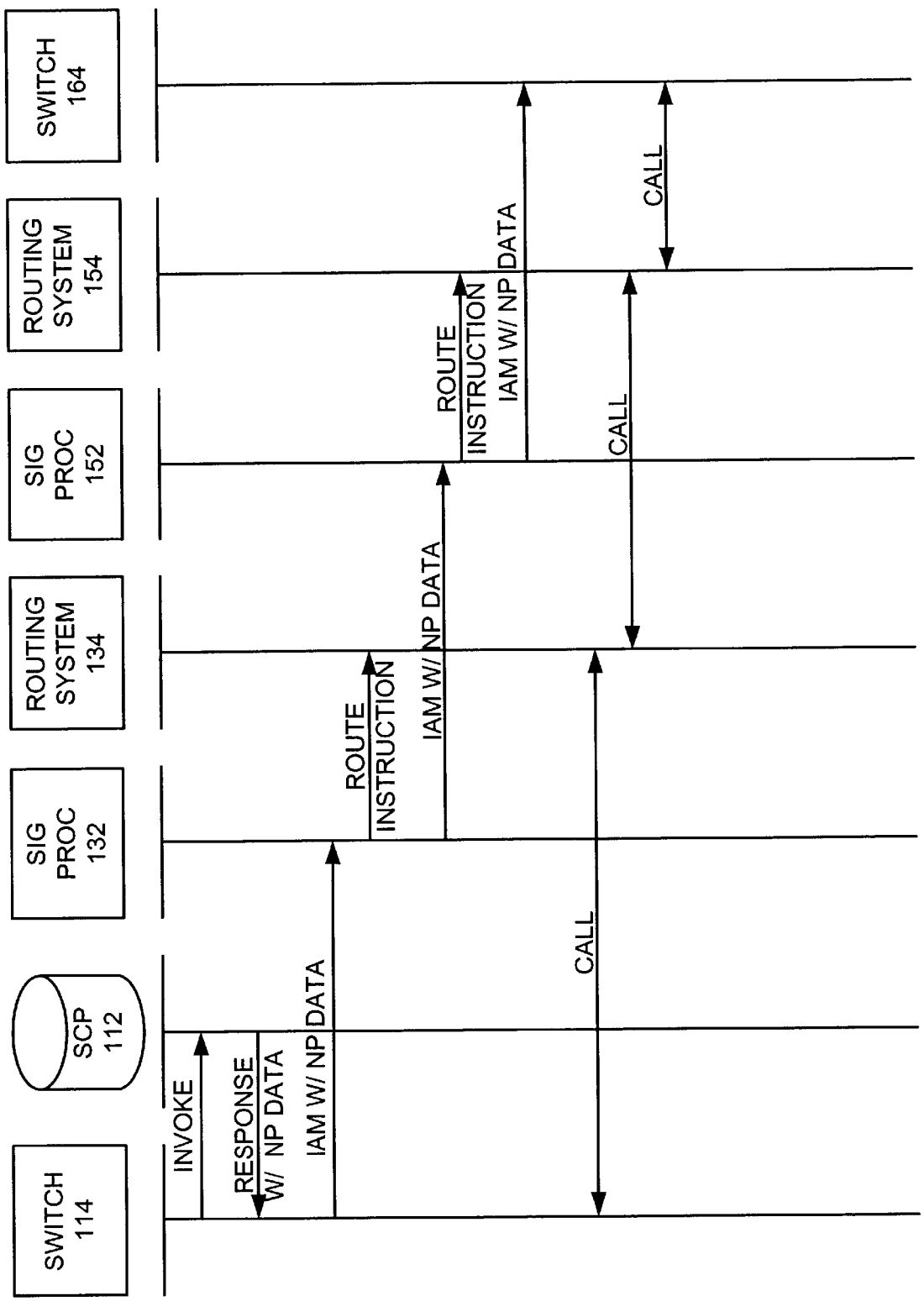
FIG. 2 is a message sequence chart for a prior solution for call processing with number portability.
Figure 3:
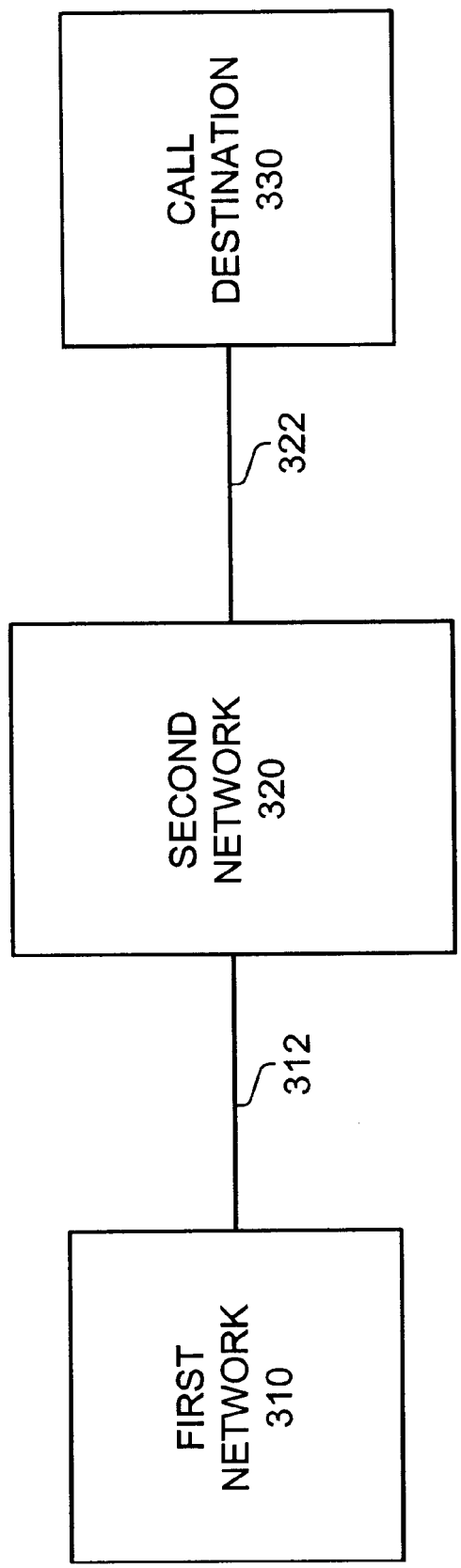
FIG. 3 is a system level block diagram of an example of the invention.

FIG. 3 depicts a system level block diagram of an example of the invention. In FIG. 3, a first network 310 is connected to a second network 320 by a call link 312. The second network 320 is coupled to a call destination 330 by a call link 322.

The first network 310 could be any communications system configured to transmit original number portability data to the second network 320. Number portability provides telecommunication users the ability to retain their telecommunication number such as a phone number when changing either their telecommunication service provider, location or telecommunication service. The number portability data could be any data or information associated with providing number portability. Some examples of number portability data are the Called Party Number (CdPN), the M-Bit in the Forward Call Indicator (FCI) parameter for ported number translation, Ported Number Generic Address Parameter, and Jurisdiction Information Parameter in an IAM in SS7. The call destination 330 could be any communication systems configured to receive calls from the second network 320.

The second network 320 could be any system configured to (1) receive original number portability data from the first network 310; (2) determine whether to use the original number portability data from the first network 310 for call routing, (3) if the original number portability data from the first network 310 is not used for call routing, generate and transmit a query to obtain new number portability data for call routing, (4) receive the new number portability data for call routing in response to the query, (5) generate and transmit a route instruction using the new number portability data, and (6) if the original number portability data from the first network 310 is used for call routing, generate and transmit the route instruction using the original number portability data.

In operation, the first network 310 transmits the original number portability data to the second network 320 via the call link 312. The second network 320 receives the original number portability data from the first network 310. The second network 320 then determines whether to use the original number portability data from the first network 310 for call routing. If the original number portability data from the first network 310 is not used for call routing, the second network 320 generates an instruction to obtain new number portability data for call routing. The second network 320 receives the new number portability data for call routing in response to the query. The second network 320 then generates and transmits a route instruction using the new number portability data. If the original number portability data from the first network 310 is used for call routing, the second network 320 generates and transmits the route instruction using the original number portability data. The second network 320 then uses the appropriate number portability data to set up the call between the first network 310 and the call destination 330.

FIGS. 4–7 disclose one embodiment of the invention, but the invention is not restricted to the configuration provided below. Those skilled in the art will appreciate numerous variations in a communication system configuration and operation that are within the scope of the invention. Those skilled in the art will also appreciate how the principles illustrated in this example can be used in other examples of the invention. A particular reference number in one figure refers to the same element in all of the other figures.

Figure 4:
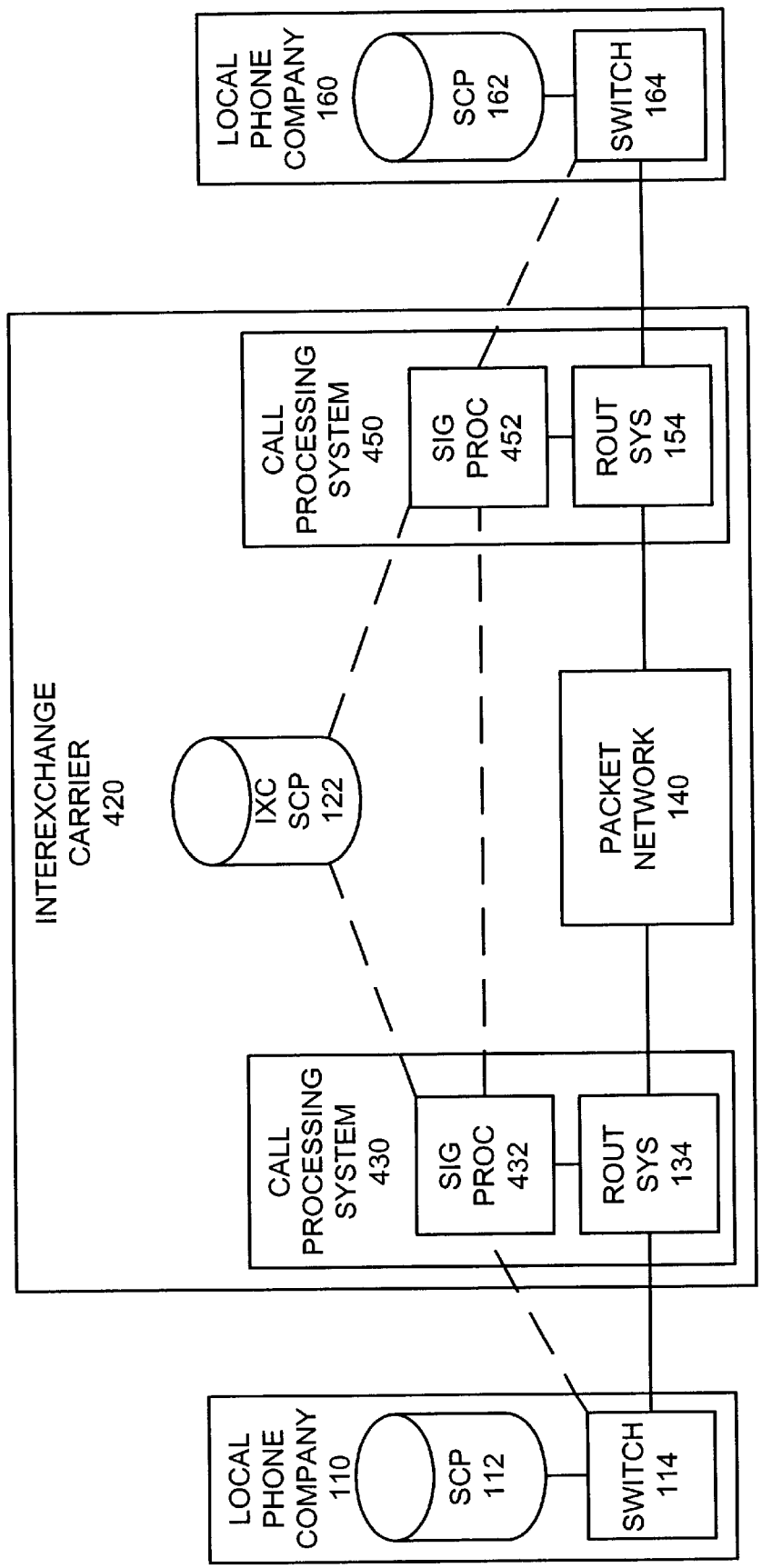
FIG. 4 is a system level block diagram with a packet network in an example of the invention.

FIG. 4 depicts a system level block diagram with a packet network 140 in an example of the invention. In FIG. 4, a local telephone company comprises a local telephone company Service Control Point (SCP) 112 and a local telephone company switch 114. The SCP 112 is connected to the switch 114.

An interexhange carrier (IXC) 420 comprises an IXC SCP 122, a call processing system 430, a packet network 140, and a call processing system 450. The call processing system 430 comprises a signaling processor 432 and a routing system 134. The call processing system 450 comprises a signaling processor 452 and a routing system 154. The signaling processor 432 is connected to the switch 114, the IXC SCP 122, the signaling processor 452, and the routing system 134. The routing system 434 is connected to the switch 114 and the packet network 140. The signaling processor 452 is connected to the IXC SCP 122, a local telephone company switch 164, and the routing system 154. The routing system 154 is connected to the packet network 140 and the switch 164. A local telephone company 160 comprises a local telephone company SCP 162 and the switch 164. The SCP 162 is connected to the switch 164.

Figure 5:
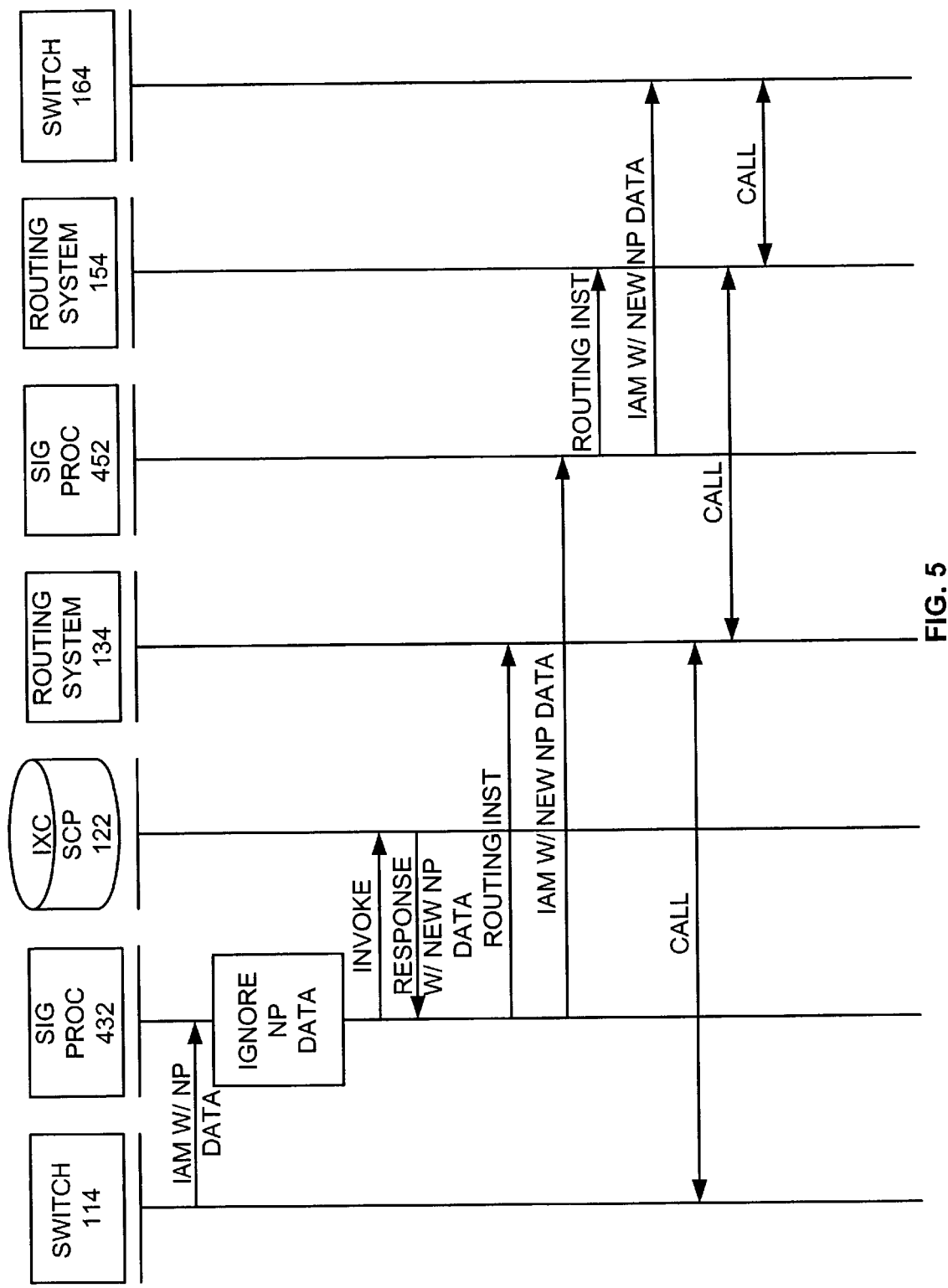
FIG. 5 is a message sequence chart for reaching a threshold for misrouted call in an example of the invention.

FIG. 5 is a message sequence chart for reaching a threshold for misrouted calls in an example of the invention. In FIG. 5, the IXC 420 has agreed to accept the number portability data from the local telephone company 110, but the total number of misrouted calls has reached a threshold for misrouted calls.

The local telephone company 110 transmits an IAM including the original number portability data for a call to the signaling processor 432. The signaling processor 432 then receives the IAM with the original number portability data. The signaling processor 432 processes the IAM to determine whether to use the original number portability data for call routing. The signaling processor 432 determines not to use the original number portability data for call routing because a threshold for misrouted calls has been exceeded based on the number of misrouted calls.

The threshold for misrouted calls could be any number that is indicative of an unacceptable number of misrouted calls that would trigger the call processing system 430 to disregard the original number portability data from the local telephone company 110 for call routing and obtain new number portability data for call routing. In different embodiments of the invention, the threshold may be set on a per trunk basis, per trunk group basis, per Point Code basis, per a first network basis, per called party number basis, or per every call basis. Also, in different embodiments of the invention, the threshold may be a total number of misrouted calls or a misrouted call percentage of total calls, attempted calls, or correctly routed calls. The threshold may also be time based. For example, the threshold is 5 misrouted calls occurring in 5 minutes.

The signaling processor 432 then transmits an invoke message to the IXC SCP 122 to query for new number portability data. In one embodiment of the invention, the signaling processor 432 transmits an invoke message to the IXC SCP 122 to query for new number portability data because there is no number portability data. The IXC SCP 122 processes the invoke message to obtain new number portability data for the call and transmits a response including the new number portability data. The signaling processor 432 then receives the response with the new number portability data.

The signaling processor 432 then generates and transmits a first route instruction for the routing system 134 based on the processing of the IAM and the response with the new number portability data. The signaling processor 432 also transmits the IAM with the new number portability data to the signaling processor 452.

The signaling processor 452 then receives the IAM with the new number portability data. The signaling processor 452 processes the IAM. The signaling processor 452 then generates and transmits a second route instruction for the routing system 154 based on the processing of the IAM with the new number portability data. The signaling processor 452 also transmits the IAM with the new number portability data to the switch 164. The switch 164 processes the IAM. The switch 164 responds with a series of messages for call setup to the switch 114 via the signaling processor 452 and the signaling processor 432 which are not shown for the sake of clarity. Those skilled in the art understand how the call is set up between the switch 114 and the switch 164 via the routing system 134, the packet network 140, and the routing system 154.

In one embodiment of the invention, the processing of the signaling processor 432 is manually overridden. For example, the IXC 420 receives a manual override message to override the processing after the threshold is reached to use the original number portability data for call routing. In another example, the IXC 420 receives a manual override message to override the determination of the threshold with obtaining new number portability data even if the threshold is not reached. With the manual override capability, the IXC 420 controls the processing of number portability data if an incorrect threshold is met or incorrect number portability data is consistently being received from the local telephone company 110.

Figure 6:
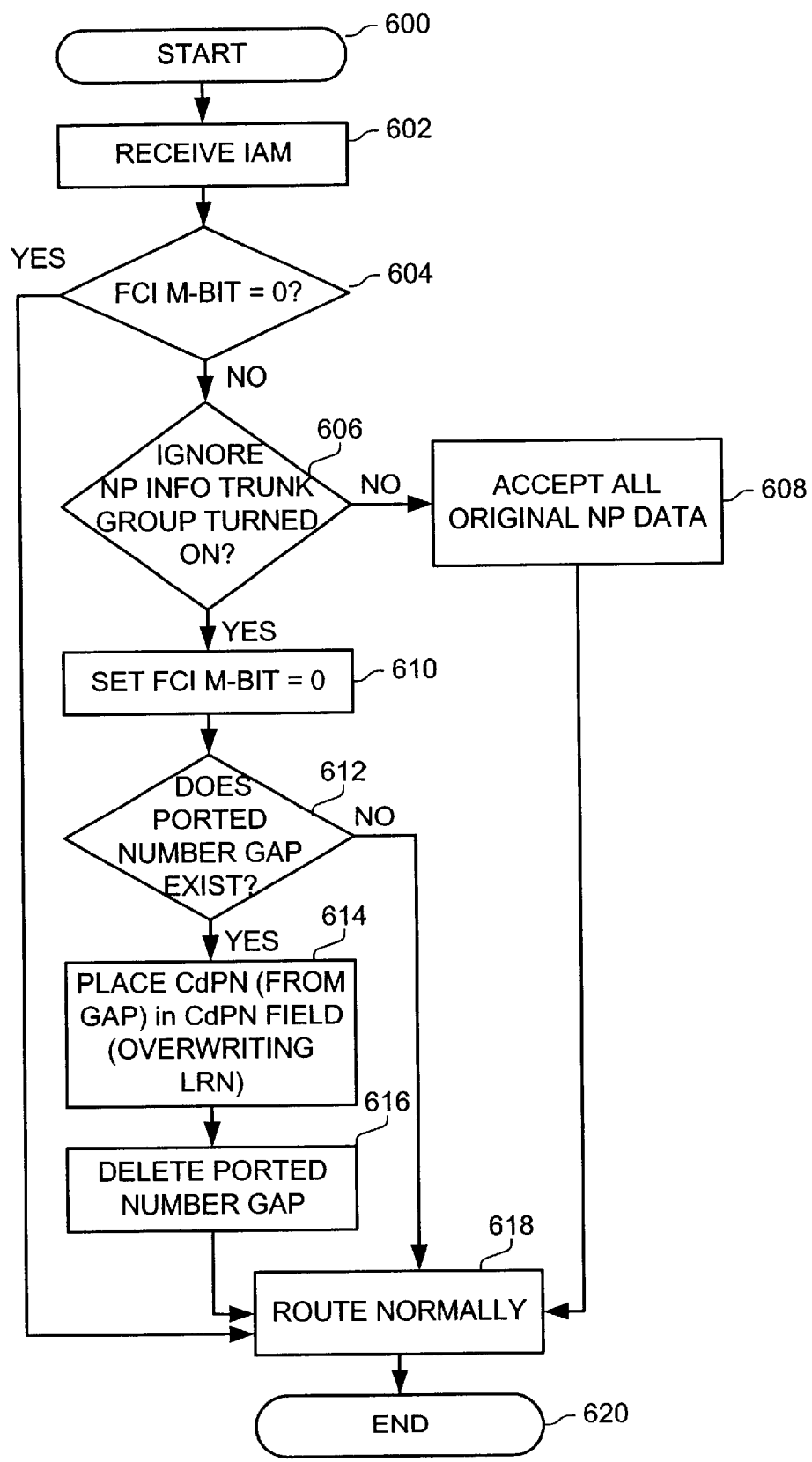
FIG. 6 is a flow chart for a signaling processor in an example of the invention.

FIG. 6 depicts a flow chart for the signaling processor 432 in an example of the invention. FIG. 6 begins in step 600. In step 602, the signaling processor 432 receives the IAM message. In step 604, the signaling processor 432 checks if an M-Bit in the FCI parameter in the IAM message is a "0". In the M-Bit in the FCI parameter in the IAM message, a "1" indicates that a database dip to any SCP for number portability data has successfully occurred, while a "0" indicates that no database dip to any SCP for number portability data has successfully occurred. If the M-Bit is a "0", then the signaling processor 432 proceeds to step 618 to route normally based on the data filled.

If the M-Bit is a "1", the signaling processor 432 checks if the Ignore Number Portability (NP) Information Trunk Group Option is turned on in step 606. In other embodiments of the invention, the Ignore Number Portability (NP) Information Trunk Group Option could be any flag or variable to indicate to disregard the number portability data for call routing. If the Ignore NP Information Trunk Group Option is not turned on, the signaling processor 432 accepts all the original number portability data for call routing in step 608 before proceeding to the step 618. If the Ignore NP Information Trunk Group Option is turned on, the signaling processor 432 sets the M-Bit in the Forward Call Indicator (FCI) parameter in the IAM message to a "0" in step 610.

In step 612, the signaling processor 432 checks if the Ported Number Generic Address Parameter (GAP) exists in the IAM message. If the Ported Number GAP does not exist, the signaling processor 432 proceeds to step 618. If the Ported Number GAP does exist, the signaling processor 432 places the Called Party Number (CdPN) from the GAP into the Called Party Number (CdPN) field in step 614. In step 616, the signaling processor 432 deletes the Ported Number GAP and then proceeds to step 618. The process ends in step 620 for FIG. 6 and continues in step 700 in FIG. 7.

Figure 7:
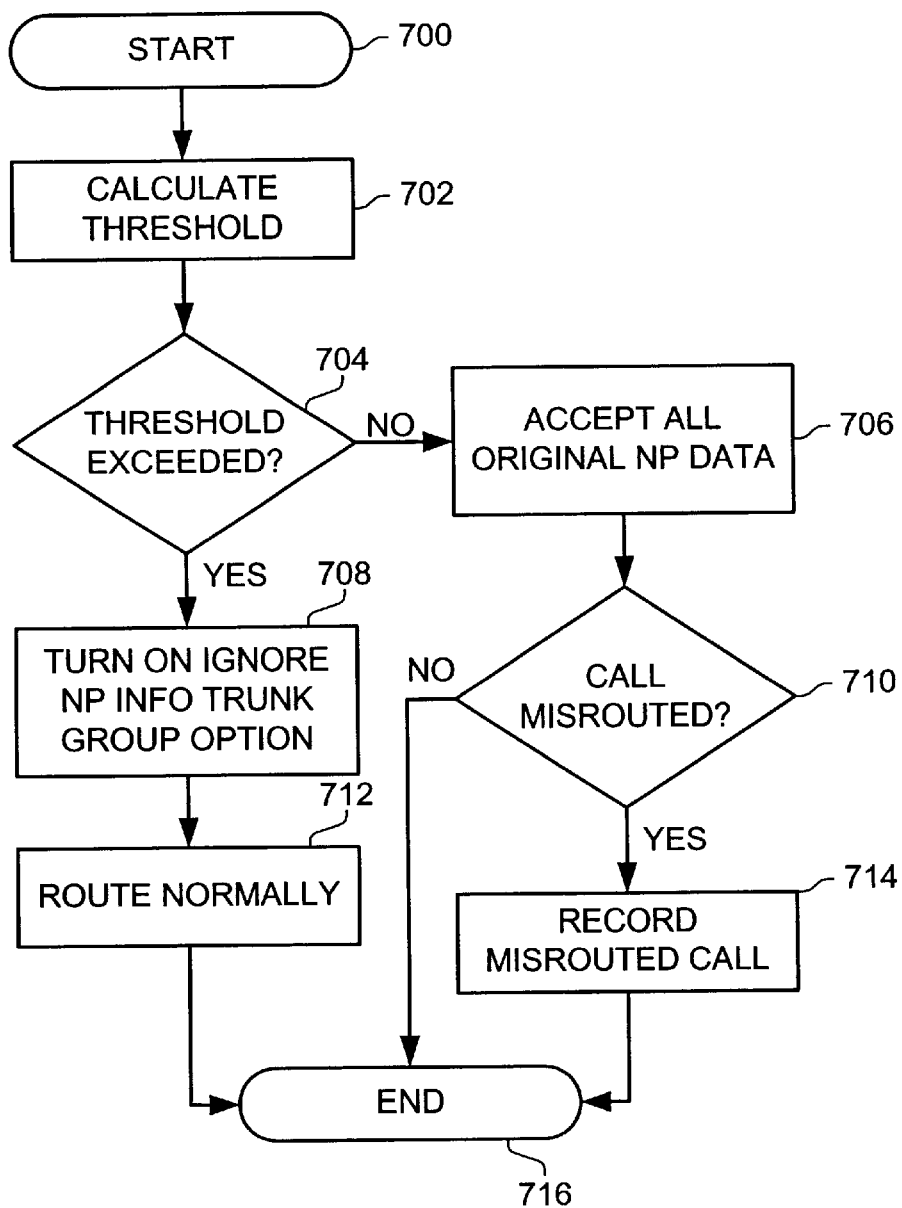
FIG. 7 is a flow chart for a signaling processor in an example of the invention.

FIG. 7 depicts a flow chart for the signaling processor 432 in an example of the invention. FIG. 7 begins in step 700. In step 702, the signaling processor 432 calculates the threshold for this incoming trunk group. The signaling processor 432 then checks whether the threshold has been exceeded based on the number of misrouted calls in step 704. If the threshold is exceeded, the signaling processor 432 turns on the Ignore Number Portability (NP) Information Trunk Group Option in step 708 before proceeding to step 712. In step 712, the signaling processor 432 routes normally based on the data filled before proceeding to step 716.

If the threshold is not exceeded, the signaling processor 432 accepts all the original number portability data for call routing in step 706 before proceeding to the step 710. In step 710, the signaling processor 432 checks if the call is misrouted. Those skilled in the art understand there are many ways to determine if a call is misrouted. Some examples are checking for specific Release (REL) with cause or a Specific Routing Error message for number portability. If the call is not misrouted, the signaling processor 432 proceeds to step 716. If the call is misrouted, the signaling processor 432 records the misrouted call in step 714. The process ends in step 716 for FIG. 7.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of call processing, the method comprising:
receiving original number portability data from a first network into a second network;
determining whether to use the original number portability data from the first network for call routing;
if the original number portability data from the first network is not used for call routing, generating and transmitting a query to obtain new number portability data for call routing from the second network;
receiving the new number portability data for call routing into the second network in response to the query;
generating and transmitting a route instruction using the new number portability data from the second network; and if the original number portability data from the first network is used for call routing, generating and transmitting the route instruction using the original number portability data from the second network.

2. The method of claim 1 further comprising:
   determining in the second network whether calls are misrouted;
   processing in the second network the number of misrouted calls to determine whether a threshold has been exceeded; and
   disregarding in the second network the original number portability data from the first network for call routing based on the determination that the threshold has been exceeded.

3. The method of claim 2 further comprising:
   querying from the second network to obtain the new number portability data based on the determination that the threshold has been exceeded; and
   receiving a response including the new number portability data from the Service Control Point into the second network.

4. The method of claim 2 wherein the threshold is set on a per trunk basis.

5. The method of claim 2 wherein the threshold is set on a per trunk group basis.

6. The method of claim 2 wherein the threshold is set on a Point Code basis.

7. The method of claim 2 wherein the threshold is set on a first network basis.

8. The method of claim 2 wherein the threshold is set on a called party number.

9. The method of claim 2 wherein the threshold is set for every incoming ported call.

10. The method of claim 2 wherein the threshold comprises a total number of misrouted calls.

11. The method of claim 2 wherein the threshold comprises a misrouted call percentage.

12. The method of claim 2 wherein the threshold is time based.

13. The method of claim 2 further comprising receiving a manual override message to bypass the determination that the threshold has been exceed.

14. The method of claim 1 further comprising receiving signaling including the original number portability data from the first network into the second network.

15. The method of claim 14 wherein the signaling is an Initial Address Message in Signaling System #7.

16. The method of claim 1 further comprising generating and transmitting signaling including the original number portability data from the second network.

17. The method of claim 1 further comprising generating and transmitting signaling including the new number portability data from the second network.

18. The method of claim 1 wherein determining whether to use the original number portability data from the first network for call routing comprises checking a flag to disregard the original number portability data.

19. The method of claim 1 further comprising receiving a manual override message to bypass the determination whether to use the original number portability data from the first network for call routing.

20. A software product for call processing comprising:
    network software operational when executed by a processor to direct the processor to receive original number portability data from a first network, determine whether to use the original number portability data from the first network for call routing, generate and transmit a query to obtain new number portability data for call routing if the original number portability data from the first network is not used for call routing, receive the new number portability data for call routing in response to the query, generate and transmit a route instruction using the new number portability data, and generate and transmit the route instruction using the original number portability data if the original number portability data from the first network is used for call routing; and
    a software storage medium operational to store the network software.

21. The software product of claim 20 wherein the network software is operational when executed by the processor to direct the processor to determine whether calls are misrouted, process the number of misrouted calls to determine whether a threshold has been exceeded, and disregard the original number portability data from the first network for call routing based on the determination that the threshold has been exceeded.

22. The software product of claim 21 wherein the second network software is operational when executed by the processor to direct the processor to query to obtain the new number portability data based on the determination that the threshold has been exceeded and receiving a response including the new number portability data from the Service Control Point.

23. The software product of claim 21 wherein the threshold is set on a per trunk basis.

24. The software product of claim 21 wherein the threshold is set on a per trunk group basis.

25. The software product of claim 21 wherein the threshold is set on a Point Code basis.

26. The software product of claim 21 wherein the threshold is set on a first network basis.

27. The software product of claim 21 wherein the threshold is set on a called party number.

28. The software product of claim 21 wherein the threshold is set for every incoming ported call.

29. The software product of claim 21 wherein the threshold comprises a total number of misrouted calls.

30. The software product of claim 21 wherein the threshold comprises a misrouted call percentage.

31. The software product of claim 21 wherein the threshold is time based.

32. The software product of claim 21 wherein the second network software is operational when executed by the processor to direct the processor to receive a manual override message to bypass the determination that the threshold has been exceed.

33. The software product of claim 20 wherein the network software is operational when executed by the processor to direct the processor to receive signaling including the original number portability data from the first network.

34. The software product of claim 33 wherein the signaling is an Initial Address Message in Signaling System #7.

35. The software product of claim 20 wherein the network software is operational when executed by the processor to direct the processor to generate and transmit signaling including the original number portability data.

36. The software product of claim 20 wherein the network software is operational when executed by the processor to direct the processor to generate and transmit signaling including the new number portability data.

37. The software product of claim 20 wherein the network software is operational when executed by the processor to direct the processor to check a flag to disregard the original number portability data.

38. The method of claim 20 wherein the network software is operational when executed by the processor to direct the processor to receive a manual override message to bypass the determination whether to use the original number portability data from the first network for call routing.

39. A network system for call processing, the network system comprising:

a processor configured to receive original number portability data from an interface, determine whether to use the original number portability data from the first network for call routing, generate and transmit a query to obtain new number portability data for call routing if the original number portability data from the first network is not used for call routing, receive the new number portability data for call routing in response to the query, generate and transmit a route instruction using the new number portability data, and generate and transmit the route instruction using the original number portability data if the original number portability data from the first network is used for call routing; and the interface configured to transfer the original number portability data from the first network to the processor, transfer the query from the processor, transfer the new number portability data to the processor, and transfer the route instruction from the processor.

40. The network system of claim 39 wherein the processor is configured to determine whether calls are misrouted, process the number of misrouted calls to determine whether a threshold has been exceeded in the second network, and disregard the original number portability data from the first network for call routing based on the determination that the threshold has been exceeded in the second network.

41. The network system of claim 40 wherein:

the processor is configured to query to obtain the new number portability data based on the determination that the threshold has been exceeded and receive a response including the new number portability data from the interface; and the interface is configured to transfer the response including the new number portability data to the processor.

42. The network system of claim 40 wherein the threshold is set on a per trunk basis.

43. The network system of claim 40 wherein the threshold is set on a per trunk group basis.

44. The network system of claim 40 wherein the threshold is set on a Point Code basis.

45. The network system of claim 40 wherein the threshold is set on a first network basis.

46. The network system of claim 40 wherein the threshold is set on a called party number.

47. The network system of claim 40 wherein the threshold is set for every incoming ported call.

48. The network system of claim 40 wherein the threshold comprises a total number of misrouted calls.

49. The network system of claim 40 wherein the threshold comprises a misrouted call percentage.

50. The network system of claim 40 wherein the threshold is time based.

51. The network system of claim 40 wherein:

the processor is configured to receive a manual override message to bypass the determination that the threshold has been exceed from the interface; and the interface is configured to transfer the manual override message to the processor.

52. The network system of claim 39 wherein:

the processor is configured to receive signaling including the original number portability data from the interface; and the interface is configured to transfer the signaling including the original number portability data from the first network to the processor.

53. The network system of claim 52 wherein the signaling is an Initial Address Message in Signaling System #7.

54. The network system of claim 39 wherein:

the processor is configured to generate and transmit signaling including the original number portability data to the interface; and the interface is configured to transfer the signaling including the original number portability data from the processor.

55. The network system of claim 39 wherein:

the processor is configured to generate and transmit signaling including the new number portability data to the interface; and the interface is configured to transfer the signaling including the new number portability data from the processor.

56. The network system of claim 39 wherein the processor is configured to check a flag to disregard the original number portability data.

57. The network system of claim 39 wherein:

the processor is configured to receive a manual override message to bypass the determination whether to use the original number portability data from the first network for call routing; and the interface is configured to transfer the manual override message to the processor.

* * * * *